April 27, 1954 C. E. HUFFMAN 2,677,073

CONTROL DEVICE FOR SIMULTANEOUS COLOR TELEVISION

Filed Dec. 2, 1947

3 Sheets-Sheet 1

INVENTOR
Charles E. Huffman

BY Charles W. Mortimer
ATTORNEY

April 27, 1954 C. E. HUFFMAN 2,677,073

CONTROL DEVICE FOR SIMULTANEOUS COLOR TELEVISION

Filed Dec. 2, 1947 3 Sheets-Sheet 2

INVENTOR
Charles E. Huffman
BY Charles W. Mortimer
ATTORNEY

April 27, 1954 C. E. HUFFMAN 2,677,073

CONTROL DEVICE FOR SIMULTANEOUS COLOR TELEVISION

Filed Dec. 2, 1947 3 Sheets-Sheet 3

INVENTOR
Charles E. Huffman

BY Charles W. Mortimer
ATTORNEY

Patented Apr. 27, 1954 2,677,073

UNITED STATES PATENT OFFICE 2,677,073

CONTROL DEVICE FOR SIMULTANEOUS COLOR TELEVISION

Charles E. Huffman, Upper Montclair, N. J., assignor to Allen B. Du Mont Laboratories, Inc., Passaic, N. J., a corporation of Delaware Application December 2, 1947, Serial No. 789,298

5 Claims. (Cl. 315—13)

This invention relates to a control device for the beam of a cathode-ray tube. It is particularly useful in connection with a three-gun simultaneous color television cathode-ray tube that has three sets of surfaces with surfaces of each set parallel to the other surfaces of that set and perpendicular to the two other sets of surfaces. Such a device is described in application, Serial No. 718,364, filed by Stanley J. Koch and Robert E. Rutherford December 26, 1946, entitled "Color Television," and assigned to the assignee of this application.

As shown in my application, Serial No. 789,295, entitled "Control Signals for Simultaneous Color Television," filed of even date herewith, the function of a control device in a color television tube is to provide corrective signals for any color line whenever the scanning path of that color line departs from its desired relation to the scanning path of other color lines.

There are three sets of color lines in such a tube which are to be controlled simultaneously. Therefore there is need to provide three distinct sets of control signals, which are separated from, and independent of, each other. The main object of the device described herein is to accomplish this.

The invention may be understood from the description in connection with the accompanying drawings in which.

Figure 4:
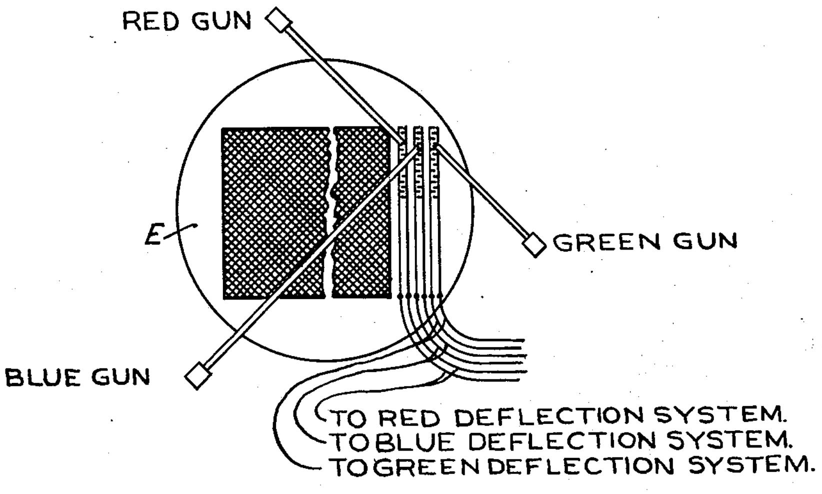
Figure 5:
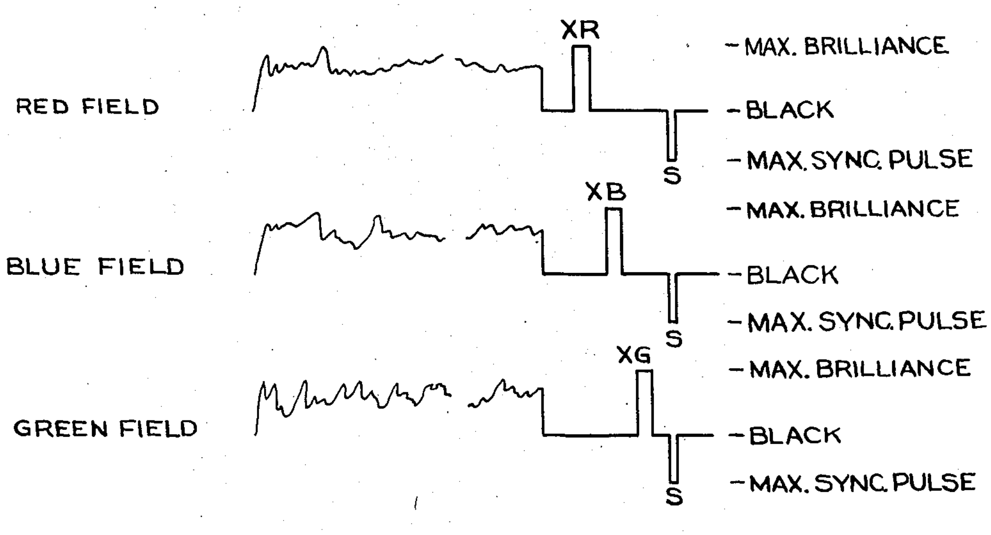

Fig. 4 is a diagram showing the relationship between the screen, the electron guns and the control structure, and Fig. 5 shows transmitted waveforms that are used with this device to provide for modulation of the respective color scanning beams during that particular time in which each beam intercepts its associated control structure in that portion of the control area allotted to that color, as for instance the particular instant shown in Fig. 4.

Figure 1:
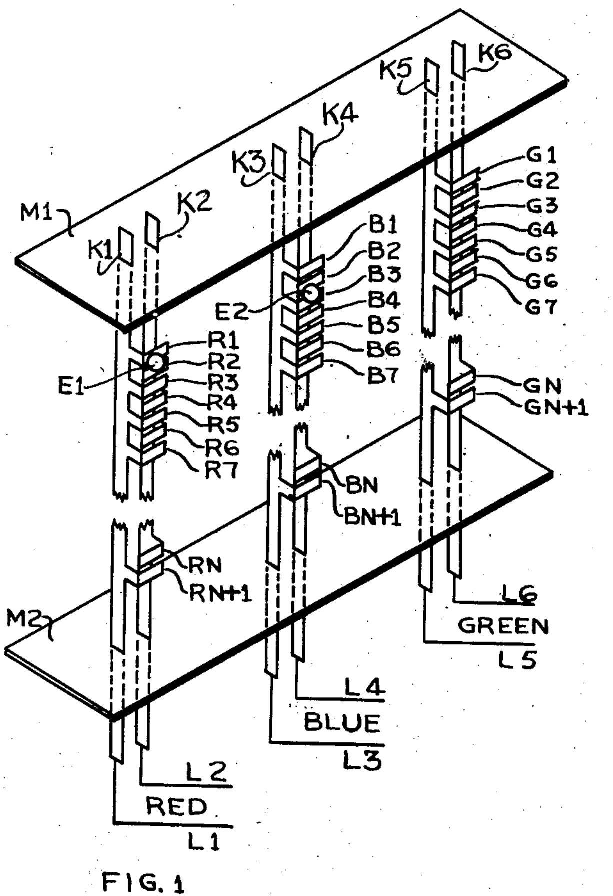
Fig. 1 is an enlarged perspective view of the control device which is located at one side of the screen.

Referring to Fig. 1, reference characters K1, K2, K3, K4, K5 and K6 indicate comb-like conducting elements which form the bar-like targets R1 to RN+1, B1 to BN+1 and G1 to GN+1. These elements may be supported by means of insulators M1 and M2.

Conducting elements K1 and K2 carrying bars R1, R2, etc., intercept, during the red control pulse, the electron beam that scans the surfaces that fluoresce to give a red color thus generating red control signals which are conducted by leads L1 and L2 to the red beam deflecting circuit which is similar to that shown in the application filed herewith.

In the same way the conducting elements K3 and K4 carrying B1, B2, etc., bars intercept during the blue control pulse, the electron beam that scans the surfaces that fluoresce to give a blue color thus generating blue control signals which are conducted by leads L3 and L4 to the blue beam deflecting circuit similar to that shown in said application.

Also, conducting elements K5 and K6 carrying G1, G2, etc., bars intercept during the green control pulse the electron beam that scans the surface that fluoresces to give green color thus generating green control signals which are conducted by leads L5 and L6 to the green beam deflection circuit.

Figure 2:
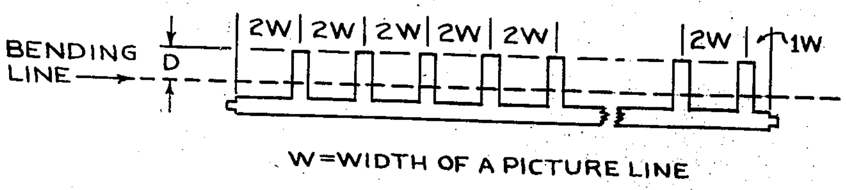
Fig. 2 is a side view of an unbent or undeveloped form partly broken away which shows one way in which the comb-like elements of the control structure have been made for fabrication of that structure.

The spacing between centers of successive bars on each individual conducting element, K1 to K6, is equal to twice the width of a picture line as shown in Fig. 2. For use with a 12" cathode-ray tube, for example, the distance 2W is approximately $\frac{1}{32}$" and the width of the R1, R2, etc., bars may be slightly greater than .010". By allotting one inch to the control area at the end of each line, the length D, Fig. 2, may be made ¼" which will allow ample time during the traverse of the scanning beam for the control signal to reach maximum amplitude without the use of excessively wide band amplifiers.

Spot E1 (Fig. 1) shows the intercept of the red beam by the control structure at the end of the first scanning line of the odd field. Spot E2 shows the intercept of the blue beam by the control structure at the end of the first scanning line of an even field.

As explained in my co-pending application, mentioned above, an electronic switch reverses the polarity of the signal output for odd and even fields during the vertical return time between fields so that the bar above a line produces accelerating correction for both fields. The number of bars required is thus halved and assembly of the elements is simplified.

Figure 3:
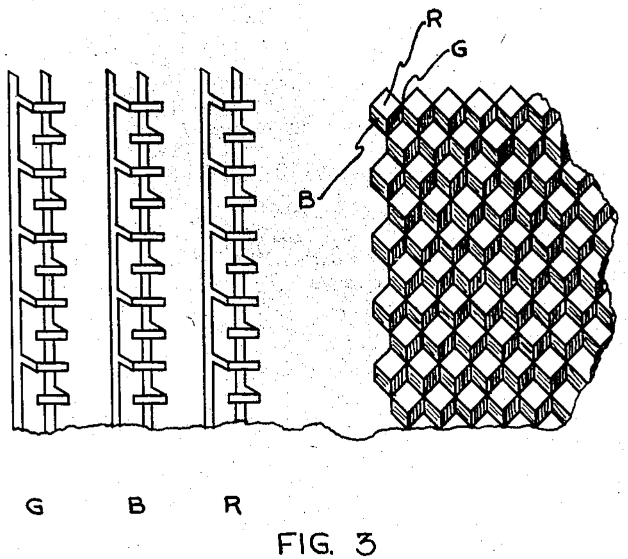
Fig. 3 is an enlarged view of a corner of the screen and control structure, showing the relation of a portion of the control structure to the screen.

Fig. 3 shows at the left hand portion thereof part of the control structure described in connection with Fig. 1 and located with respect to the edge of the three color screen. This screen structure is made up so as to have surfaces B substantially parallel to each other which fluoresce blue when scanned by an electron beam, surfaces G substantially parallel to each other which fluoresce green and surfaces R substantially parallel to each other which fluoresce red. The surfaces are all of approximately the same size and the surfaces of one color are all in substantially parallel planes, but are at angles to the two other sets of surfaces that are in turn at angles to each other and are respectively of the two other colors.

Fig. 4 shows the screen E of a cathode-ray tube upon which the surfaces described in connection with Fig. 3 are located. The three electron guns Red, Green and Blue shown in this figure are located so that the beams thereof respectively scan the three sets of parallel surfaces, each scanning a surface of one color without scanning a surface of another color.

Modulation of the scanning beams by those portions of the waves indicated by XR, XB and XG in Fig. 5 are shown to occur at that particular time when each of the three beams is traversing its respective control structures, which is during that portion of the scanning time when the picture signal is blanked out, and may preferably precede each synchronizing pulse. The amplitude of this modulation is such as to modulate the beam to an optimum value suitable for generating an adequate control signal.

What is claimed is:

1. In a color television system, an electron tube having a fluorescent coated screen adapted to emit different colors in accordance with the direction in which a cathode ray beam impinges thereon, a plurality of electron guns to produce cathode ray beams, deflecting means to cause said beams to scan said fluorescent screen, a control structure positioned within said tube adjacent said fluorescent screen to be scanned by said beams, said structure comprising a plurality of pairs of conducting buses and a plurality of sets of control conductors, said control conductors being positioned axially in the direction of the scanning line of said beams, each said set comprising a plurality of conductors connected alternately to respective conductors of said pairs of buses, each of said cathode ray beams being individually modulated at a predetermined intensity when traversing respective ones of said sets of conductors.

2. A structure according to claim 1 in which said pairs of buses are connected to produce respective separate control signals to control the positioning of the cathode ray beam scanning lines in accordance with the cathode ray beam impinging on said conductors.

3. In a system for producing color television, a cathode ray tube having a plurality of electron guns to produce a plurality of cathode ray beams, a fluorescent screen to produce light of one color in portions of said screen within a picture area and to produce light of another color in other portions of said screen, a control area positioned within said tube and adjacent said picture area and separated therefrom and in the scanning path of said cathode ray beams, said control area comprising a plurality of pairs of conductors, the number of said pairs corresponding to the number of said electron guns, each said pair comprising a plurality of additional conductors, said additional conductors being aligned with the scanning lines of said cathode ray beams, each of said cathode ray beams being individually modulated at a predetermined intensity when traversing respective sets of said additional conductors.

4. The apparatus according to claim 3 in which each of said pairs of conductors is connected to control the scanning of only one of said beams.

5. In a color television system, an electron tube having a fluorescent coated screen adapted to emit different colors in accordance with the direction in which a cathode ray beam impinges thereon, a plurality of electron guns to produce cathode ray beams, deflecting means to cause said beams to scan said fluorescent screen, a control structure positioned within said tube adjacent said screen to be scanned by said beams, said structure comprising a plurality of pairs of bus conductors corresponding in number to the number of guns, each said pair having a plurality of control conductors axially mounted normal to said pairs and connected alternately respectively to the two conductors comprising said pairs, said control conductors being aligned with the scanning lines of said beams each of said cathode ray beams being individually modulated at a predetermined intensity when traversing respective sets of said control conductors.

References Cited in the file of this patent

UNITED STATES PATENTS

| Number | Name | Date |
|---|---|---|
| 1,976,400 | Ilberg | Oct. 9, 1934 |
| 2,294,820 | Wilson | Sept. 1, 1942 |
| 2,307,188 | Bedford | Jan. 5, 1943 |
| 2,307,212 | Goldsmith | Jan. 5, 1943 |
| 2,312,792 | Bamford | Mar. 2, 1943 |
| 2,415,059 | Zworykin | Jan. 28, 1947 |
| 2,416,056 | Kallmann | Feb. 18, 1947 |
| 2,446,440 | Swedlund | Aug. 3, 1948 |
| 2,461,515 | Bronwell | Feb. 15, 1949 |
| 2,480,848 | Geer | Sept. 6, 1949 |
| 2,481,839 | Goldsmith | Sept. 13, 1949 |
| 2,518,200 | Sziklai et al. | Aug. 8, 1950 |
| 2,529,485 | Chew | Nov. 14, 1950 |
| 2,544,690 | Koch et al. | Mar. 13, 1951 |
| 2,595,548 | Schroeder | May 6, 1952 |

FOREIGN PATENTS

| Number | Country | Date |
|---|---|---|
| 562,158 | Great Britain | June 21, 1944 |
| 866,065 | France | Mar. 31, 1941 |